United States Patent [19]

Grahm

[11] Patent Number: 4,929,090
[45] Date of Patent: May 29, 1990

[54] TEMPERATURE HISTORY INDICATIANG LABEL

[76] Inventor: Isabelle Grahm, 2157 N. Vine Ave., No. 4, Hollywood, Calif. 90068

[21] Appl. No.: 261,588

[22] Filed: Oct. 24, 1988

[51] Int. Cl.$^5$ .......................... G01K 3/04; G04F 13/04
[52] U.S. Cl. .................................... 374/102; 368/114; 374/188
[58] Field of Search ............... 374/102, 103, 147, 188; 368/114; 426/88

[56] References Cited

U.S. PATENT DOCUMENTS

| | | | |
|---|---|---|---|
| 3,638,495 | 2/1972 | Sessler | 374/103 |
| 4,277,974 | 7/1981 | Karr et al. | 374/102 |
| 4,607,962 | 8/1986 | Nagao et al. | 374/103 |
| 4,746,223 | 5/1988 | Miyata et al. | 374/103 |
| 4,804,275 | 2/1989 | Kang et al. | 368/114 X |

*Primary Examiner*—Daniel M. Yasich
*Attorney, Agent, or Firm*—I. Michael Bak-Boychuk

[57] ABSTRACT

A temperature indicating label includes a rectangular, insulative panel scribed on its faces with intersecting grooves in which electrodes of a galvanic reaction are bedded. One of the electrode sets is consumed in the course of electrolytic reaction and when consumed will expose the electrolyte admixed with a dye. A switching circuit selectively steps in sequence across the consummable electrodes while another portion of the circuit selects the other electrodes in accordance with temperature.

10 Claims, 3 Drawing Sheets

TEMPERATURE HISTORY INDICATIANG LABEL

BACKGROUND OF THE INVENTION

1. FIELD OF THE INVENTION

The present invention relates to temperature sensing devices and more particularly to time-temperature patches for use with foodstuffs and the like.

2. DESCRIPTION OF THE PRIOR ART

The consumption of a galvanic cell with time and temperature is a well known phenomenon, particularly in the familiar zinc-carbon cell. Galvanic cells of this type have been extensively studied and the charge capacity of zinc is well known. Thus the consumption rate (coulombs) of the well known Leclanche cell is widely appreciated by those skilled in the art.

A Leclanche cell typically includes a zinc anode, a carbon cathode, and an ammonium chloride electrolyte with the positive and negative terminals connected to the carbon and zinc electrodes respectively. Since the charge capacity of zinc is well known (0.81 amp hours per gram) its consumption, through ionization, is also well known and predictable. Simply, a zinc electrode of a known mass provides a known number of atoms for ionic consumption and thus will consume itself in the course of producing current.

This galvanic consumption of a cell is well appreciated and has led to various developments including the time-temperature indicators described in U.S. Pat. No. 4,277,974 to Karr et al. These teachings, while suitable for their purpose, consume a single electrode as a combined function of temperature and time. Thus the foregoing indicator is primarily useful with foodstuffs which, like the cell, exhibit an exponential combination of time and temperature in their useful life. Since time and temperature are thus combined only a combined result is perceptible.

Unlike ordinary foodstuffs, wine and other liquors entail prolonged organic processes including residual fermentation and aging which ordinarily are a normal incident of production. Consequently, such products are not well suited for exponential indicators since a prolonged shelf life is a normal event of their use.

Nonetheless, such extended shelf life history is subject to its own constraints. Most frequently such constraints are in the form of upper temperature limits which, when exceeded, commence their deleterious effects on the product. An exponential galvanic cell under these circumstances will eventually consume itself, by the simple extent of its shelf life, and thus becomes useless as an indicator with time.

An indicator which is essentially rendered inactive under ordinary storage conditions is thus extensively sought and it is one such indicator that is disclosed herein.

SUMMARY OF THE INVENTION

Accordingly, it is the general purpose and object of the present invention to provide a temperature history indicator useful over long periods of time.

Other objects of the invention are to provide a temperature indicating patch which remains useful over extended periods of storage.

Yet further objects of the invention are to provide a temperature indicating patch which is convenient in fabrication and use.

Briefly, these and other objects are accomplished within the present invention by providing a regularly perforated insulative screen in the form of a rectangular patch or label having the rear surface thereof grooved with regularly spaced horizontal grooves of even depth and section. A set of evenly spaced vertical grooves is then formed an the front insulator surface each of a shaped and tapered section along the length thereof. Thus at each intersection of the vertical and horizontal grooves an opening is formed, defined in size by the depth and taper of the vertical grooves.

Each of the vertical grooves receives a conformingly elongate, tapered, strip of pure zinc intimately connected at the large end to a corresponding terminal. The horizontal grooves, in turn, each receive a fibrous deformable separator strip onto which the electrolyte is deposited. Thereafter each of the horizontal grooves is capped or covered by a graphite electrode strip again connected to a corresponding terminal. On this form an orthogonal grid is formed which at every intersection defines a singular, isolated, cell. Of course, each cell includes a sufficient quantity of electrolyte and electrodes to effect the desired galvanic reaction.

The terminals at the carbon electrodes are then each connected to its corresponding reed switch selected to close at a predetermined temperature. A corresponding current limiting circuit is then connected to each reed switch for controlling the galvanic rate of reaction. These circuits are then fed back to the corresponding cells, in a stepped sequence enabled by a mechanical switch. This sequence is set out by a current division along the lowermost carbon rank.

As result, the individual vertical zinc strips are galvanically eroded at their corresponding perforations, exposing the subjacent dark colored electrolyte to view. Thus a dot matrix histogram becomes visible to the user indicating a weighted temperature history of the product to which it is attached.

One should note that the foregoing assembly lends itself well for integrated production. Thus the patch can be conveniently fabricated on a large quantity scale including the well known processes of solid state integration. Of course, various insulative coverings and shields may be employed with the exterior shield appropriately marked or scribed to inform the user of the temperature record displayed.

DESCRIPTION OF THE PREFERRED EMBODIMENT

Figure 1:
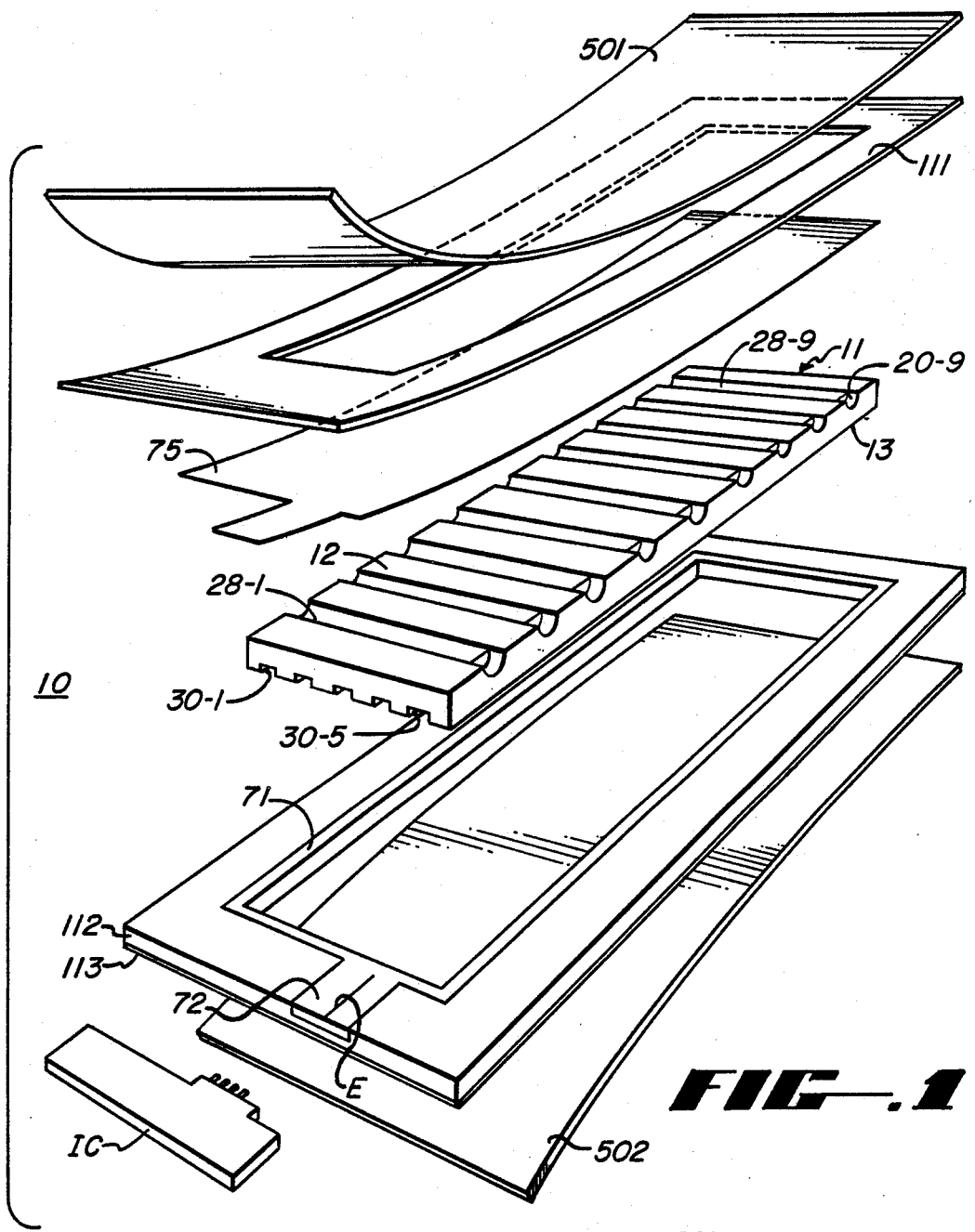
FIG. 1 is a perspective illustration of the inventive patch, separated by parts.
Figure 2:
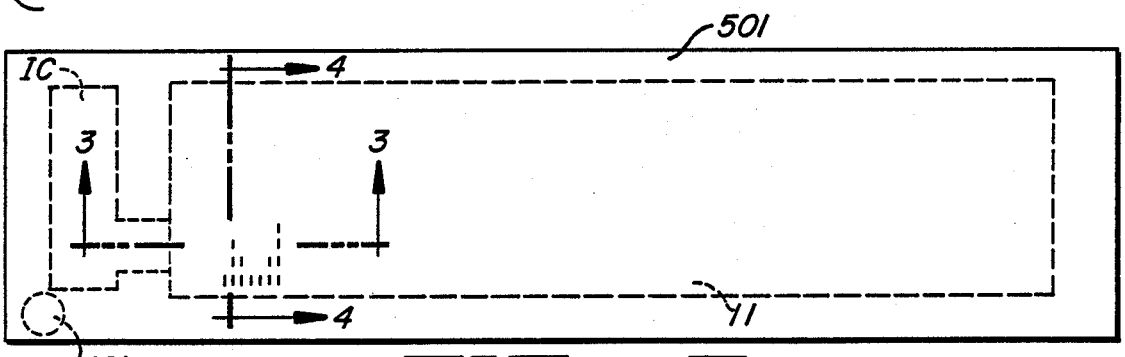
FIG. 2 is a top view of the inventive patch in its adhered configuration.
Figure 3:
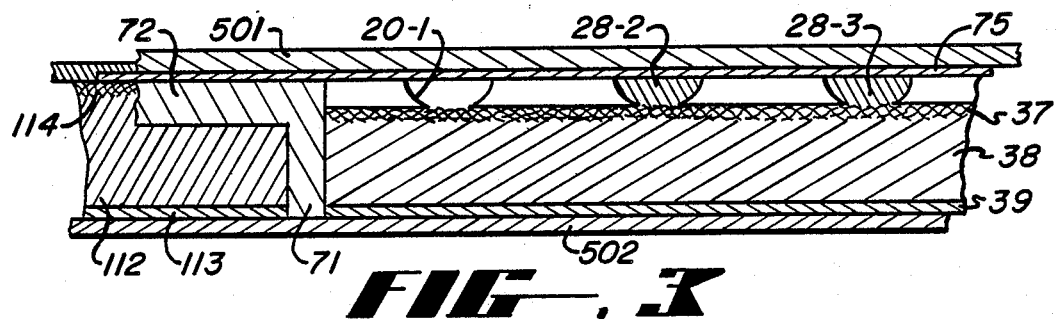
FIG. 3 is a sectional side view taken along line 3—3 of FIG. 2.
Figure 4:
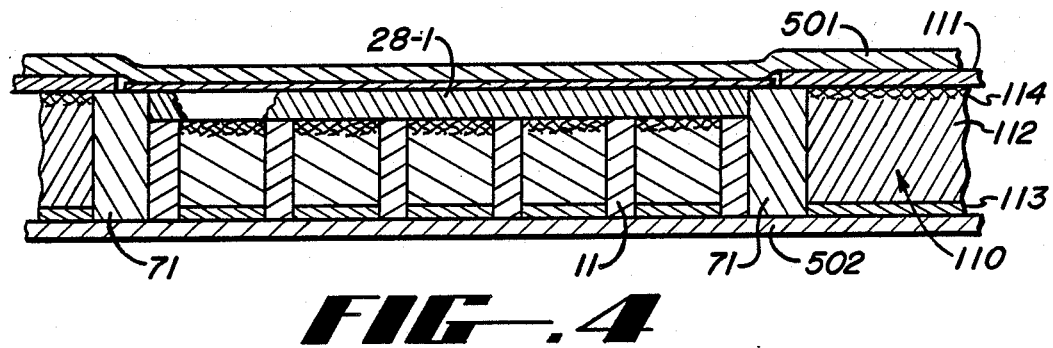
FIG. 4 is yet another sectional view taken along line 4—4 of FIG. 2.
Figure 5:
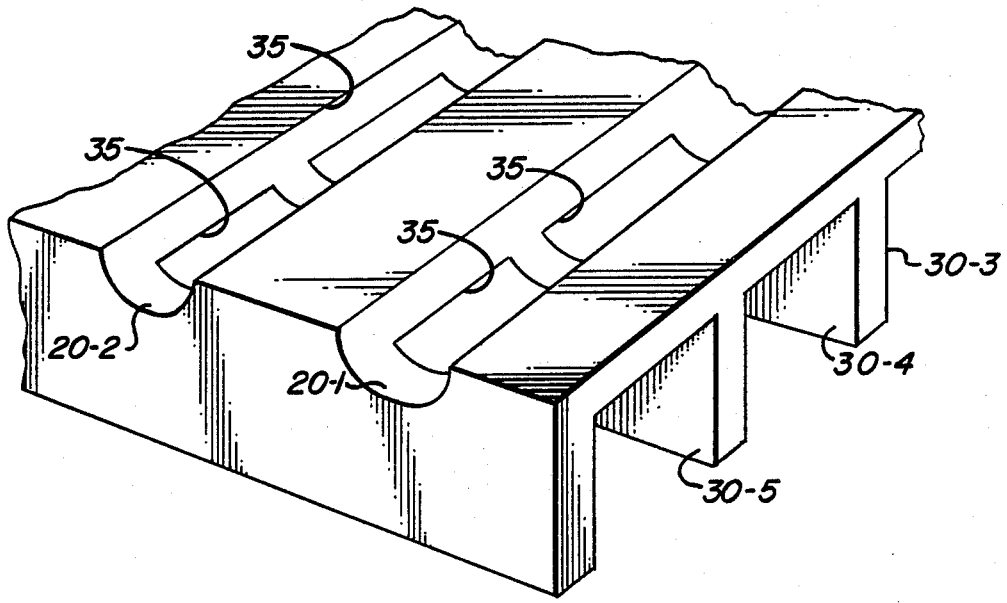
FIG. 5 is a perspective detail of a portion of a separating screen useful with the invention herein.

As shown in FIGS. 1-6 the inventive temperature sensing patch, generally designated by the numeral 10, comprises a substantially rectangular separation screen 11 formed of an inert insulative, material structure like one of the polymeric materials in the Mylar of Teflon group. This screen 11 is defined by an upper and a lower surface, 12 and 13 respectively, with the upper surface 12 grooved by a plurality of parallel, elongate, vertical grooves 20-1 through 20-9. Grooves 20-1 through 20-9 are each identical in shape, each taking the form of a progressively increasing tapered section, from a narrow end to a larger end.

The lower surface 13 is similarly grooved with a horizontal groove array comprising parallel, elongate, grooves 30-1 through 30-5, each of equal, fixed, section along its length. Preferrably screen 11 is formed of material stock 25 to 40 mils in thickness as with grooves 20-1 through 20-9 and 30-1 through 30-5 cut to interfering depths. Thus, as illustrated in detail in FIG. 5 an array of perforations or openings 35 is formed at the groove crossings which increase in sectional area with the increasing taper of the vertical grooves.

Each of the foregoing vertical grooves 20 then receive a corresponding conformingly tapered zinc strip 28-1 through 28-9 separated from each other by the interspaced screen material. Similarly each of the horizontal grooves 30 is first layered at its bottom by a fibrous conforming strip 37 and thereafter filled with electrolyte 38 and sealed at the exterior by a carbon or graphite cover strip 39, preferably in the form of a graphite loaded polymer to insure flexure.

By way of example herein electrolyte 38 may be in the form of a black, pasty, mixture of the constituents normally found in a dry cell battery hydrated to some extent to pass by wick action through the fibrous layer 37. Those skilled in the art will appreciate that a mixture of hydrated manganese dioxide, ammonium chloride, and/or zinc chloride is effective for the purposes herein, admixted with an inert dye to enhance visual perception by enhancing the optical distinction of the electrolyte from the optical characteristics of the zinc.

In this form a groove lattice in an inert sheet defines an array of discrete galvanic cells each containing a zinc mass defined by the taper of the vertical grooves 20. As set out above it is this zinc mass that is eroded by ionization in direct proportion to the current rate. This rectangular screen 11 is then fitted within the interior aperture of a rectangular edge insulator 71 onto which the various electrical leads E may be bedded in the form of a printed circuit extending onto a tab 72 aligned for connection with an integrated circuit 1C. This peripheral insulating shield 71 is then inserted into a conforming aperture in yet another peripheral electrolyte stratum 112 adhered to a graphite layer 113. When thus positioned the screen 11 and the peripheral strip 71 are overlayed with a slightly larger transparent insulating sheet 75 onto which a rectangularly shaped zinc electrode sheet 111 is aligned conformed to register with the electrolyte layer 112. The combination of sheet 111, electrolyte 112 and carbon layer 113 form a large planar storage cell 110 useful for the signal flow described herein. The combined assembly is then sheathed in transparent coverings 501 and 502 to complete the assembly.

Figure 6:
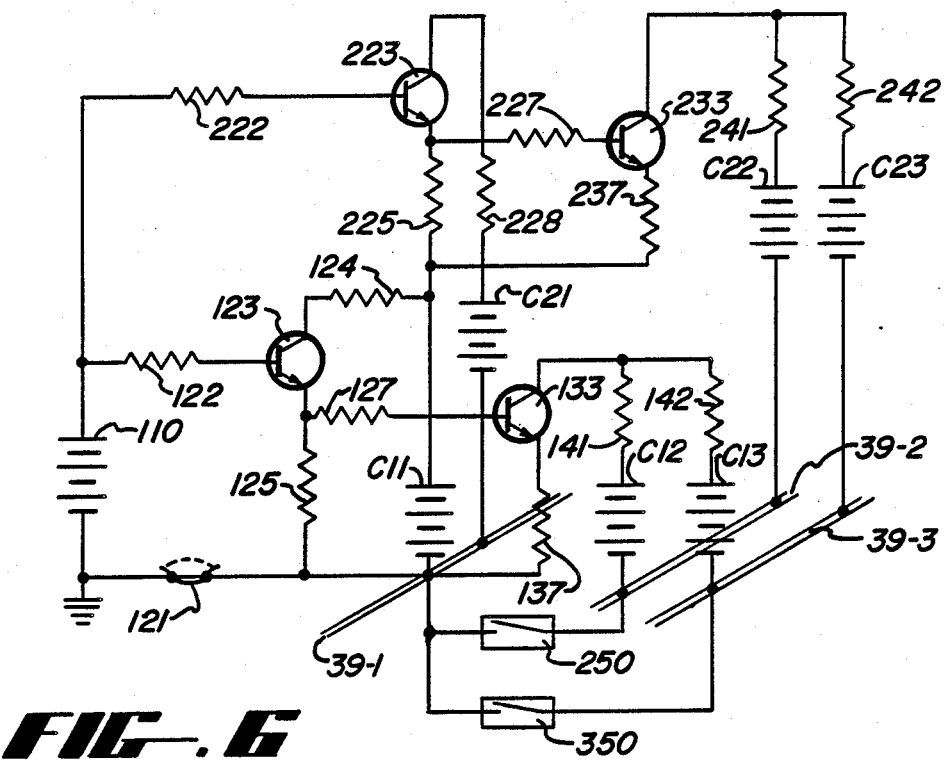
FIG. 6 is a diagrammatic illustration of an electrical circuit in accordance with the present invention.

The circuit effected in the chip IC is shown in its diagrammatic equivalent at FIG. 6. For convenience in this presentation the foregoing individual galvanic cells formed in screen 11 shall be designated by the row and column crossings, as for example cells C11 through C59. For the purposes herein cells C11 through C19 each contain an equal lowermost zinc mass for erosion while cells C21-C29 increase in zinc mass, and so on.

Thus, by selecting the correct current rate around each cell its time interval for complete erosion can be conveniently determined. Of course, such current draw can be effected by installing suitable impedances into the cell loop.

While the electrolyte consumption of zinc is well known the realistic volumetric constraints of the label 10 confine the zinc mass to very low levels. Thus for a useful life in the domain measured by months the current levels must of necessity be extremely low. Any logical switching, therefore, occurs at very low current regions of a solid state device. Even at these low levels the static base current of a typical transistor junction is measured in nanoamperes, or greater, and thus a large current source is required for extended operation. This current source is effected by the planar battery segment 110 deployed peripherally around the screen 11, as described above. This planar battery may include appropriate protection against internal shorts effected by way of a permeable, inert, fibrous separator sheet 114. Preferably the planar dimensions of the zinc electrode sheet 111 are greater than 20 square centimeters with a thickness of 1 to 2 mils, thereby providing a useful life in multiple month denomination.

With the foregoing scales in mind the electrical circuit shown in FIG. 6 will now be treated in detail. In this circuit implemented in the integrated circuit chip IC, the large capacity cell 110 provides the effective potential reference for sequential timing. This sequence is initiated by a mechanically collapsed switch 121 which is rendered closed upon sale (or bottling) of the liquid into the container onto which the inventive label 10 is adhered. Once the circuit is thus closed battery 110 is connected in circuit with a cascaded arrangement of transistors which sequentially connect cells C11, C21 through C91 for galvanic dissipation. By way of example, and in the interest of clarity only, cells C11 and C21 are shown, it being understood that the remaining cells are similarly set off along the horizontal graphite electrode 39-1 in groove 30-1. Thus, the positive side of battery 110 connects across a base bias resistor 122 to the base of a transistor 123 which at its collector receives, across a collector resistor 124, the positive side of cell C11. Transistor 123 is connected in an emitter-follower circuit with an emitter resistor 125 returning back to the negative side of battery 110. Since at full potential the charge of cell C11 approximates the potential of battery 110 transistor 123 will conduct as long as galvanic action in this cell continues. The rate of its current is thus controlled primarily by resistors 124 and 125. These resistors effectively form a voltage divider with the emitter voltage of transistor 123 then serving as the base signal, across a resistor 127, to the base of a transistor 133 which thus sets an effective base signal as long as transistor 123 is conducting. Once cell C11 is fully dissipated it becomes an effective short to ground (its effective internal resistance being negligible relative the other circuit components) and the VCE of transistor 123 then falls to zero. At this point the base signal to transistor 133 also falls to zero and all substantial conduction through this transistor then ceases.

Transistor 133 is connected at its collector, across corresponding resistors 141 and 142 to cells C12 and C13 (and by similar example to the remaining cells along the zinc electrode 28-1). These cells, in turn, complete their circuits to the graphite electrodes 39-2 and 39-3 which return to the common ground through temperature responsive reed switches 250 and 350. It is these reed switches that set the temperature at which the graphite electrodes 39-1 through 39-5 are brought into operation. (Electrode 39-1 through 39-5 indicates, by suffix number, the electrode 39 in the corresponding groove 30-1 through 30-5).

In a similar manner a transistor 223 fed by a base resistor 222 from battery 110 develops an emitter follower signal at an emitter resistor 225. This emitter signal connects, in turn, to cell C11 and is thus floated at its potential. This same floating potential is concurrently applied to the end of an emitter resistor 237 at a transistor 233 switched by a base signal from the emitter of transistor 223. The collector of transistor 223 is fed, across resistor 228, from cell C21 while the emitter of transistor 233 is tied to cell C11.

Accordingly, as long as cells C11 and C21 are at the same potential no conduction will occur through transistor 233. Once cell C11 dissipates an effective conduction path is established to render conduction through cells C22 and C23 across their resistors 241 and 242 and transistor 233.

This sequence of floating the conduction thus sets a stepping ladder for a time sequence in which the various vertical zinc strips are brought in. Once two adjacent cells in the lowermost rank are dissipated no further action will occur along this zinc strip. Accordingly, a visual display of eroded zinc apertures is devised which advances at the rate set by the consumption of the lowermost rank.

Of course the 9×5 cell matrix, defined by the crossings of grooves 20-1 through 20-9 and 30-1 through 30-5, as described above, is exemplary only. Larger matrices are contemplated and may conveniently be effected in accordance with the example above. Moreover, the progressively increasing zinc section allows for selective circuit emphasis (as determined by the resistor network) on those aperture ranks in the higher, more critical temperature region. These same larger zinc sections are associated with larger openings 35 which thus render perception of significant temperature levels more effective. To further enhance this perception the exterior of the covering 501 may be scribed, color coded, or otherwise marked to suit the application.

Figure 7:
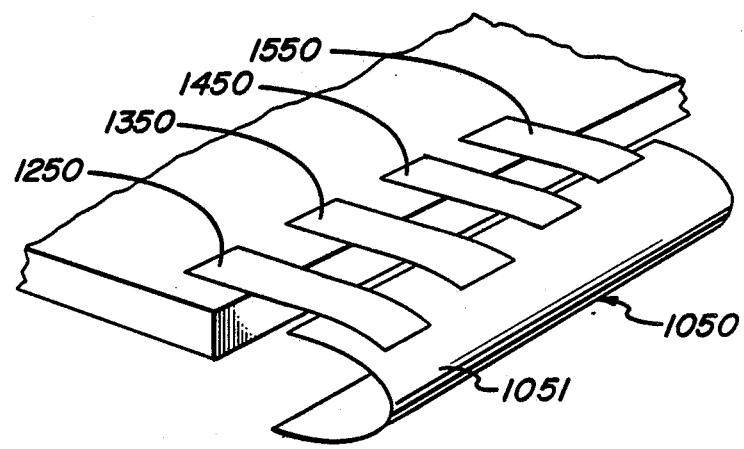
FIG. 7 is a perspective view of a temperature switch assembly useful with the present invention.

In a further alternative shown in FIG. 7 an integrated switch bank 1050 may be devised in which a curled common contact 1051 expands or uncurls with temperature. A plurality of contact tabs 1250, 1350, 1450 and 1550 extend to varying separations above contact 1051 and are thus contacted at selected temperature levels. These contacts may be substituted for and may effect the function of reed switches 250 and 350 as described above.

Obviously many modifications and changes may be made to the foregoing description without departing from the spirit of the invention. It is therefore intended that the scope of the invention be determined solely on the claims appended hereto.

What is claimed is:

1. An indicating label for indicating temperature history with time, comprising:
an electrically insulative panel of substantially planar configuration characterized by a first and second surface on the opposing sides thereof, said first surface including a plurality of first elongate grooves aligned along a first direction thereon, said second surface including a plurality of second elongate grooves aligned along a second direction thereon, said first and second grooves being formed to intersecting depths whereby a corresponding opening is formed in said panel at each intersection of said first and second grooves;
a plurality of first electrode strips conformed for corresponding receipt in said first grooves;
a plurality of second electrode strips conformed for corresponding receipt in said grooves;
a plurality of electrolyte layers deposited in said second recesses in electric contact between the corresponding ones of said first and second electrodes, said electrolyte layers being of a chemical composition selected to consume said first electrodes in the course of producing electrical current; and
switching means operatively connected between said first and second electrodes including corresponding temperature responsive contacts in circuit with respective ones of said second electrodes for completing an electrical circuit with the respective ones of said second electrodes at predetermined levels of temperature.

2. Apparatus according to claim 1 further comprising:
an electrically insulative covering convolved around the exterior of said panel.

3. Apparatus according to claim 2 wherein:
said insulative covering includes translucent material segments; and
said electrolyte layers are optically distinct from the optical characteristics of said first electrodes.

4. Apparatus according to claim 3 further comprising:
electrical storage means received in said covering and connected to said switching means.

5. Apparatus according to claim 4 wherein:
said covering is conformed for adhesive contact.

6. Apparatus according to claim 1 wherein:
said first and second electrodes and said electrolyte layers are selected from materials conformed for electrolyte reaction; and
said switching means further includes a manually effected contact for enabling a circuit with a predetermined one of said second electrodes.

7. A temperature time history indicating label comprising:
a substantially planar insulative panel provided with a plurality of spaced perforations, said panel being defined by a first and a second surface;
a plurality of electrolyte quantities received in said perforations;
a plurality of first elongate electrodes deposited in spaced relationship on said first surface in a first alignment, each said first electrode extending over corresponding ones of said perforations;
a plurality of second elongate electrodes deposited in spaced relationship on said second surface in a second alignment over corresponding ones of said perforations, said first alignment being in a direction to intersect said second alignment;
temperature responsive circuit means connected to said second electrodes for selective connection therewith in response to preselected levels of temperature; and
switching means connected between said circuit means and a selected one of said first electrodes, for completing an electrical circuit therebetween.

8. Apparatus according to claim 7 wherein:
said first and second electrodes and said electrolyte quantities are selected for electrolytic reaction whereby said first electrodes are consumed.

9. Apparatus according to claim 8 wherein:

said electrolyte quantities are optically distinct from the optical characteristics of said first electrodes.

10. Apparatus according to claim 9 further comprising:
 a translucent, electrically insulative covering surrounding said panel, said first and second electrodes, and said switching means.

* * * * *